Dec. 15, 1942.  W. W. STEAD  2,305,039
DEEP FAT FRYER
Filed May 20, 1941  2 Sheets-Sheet 1
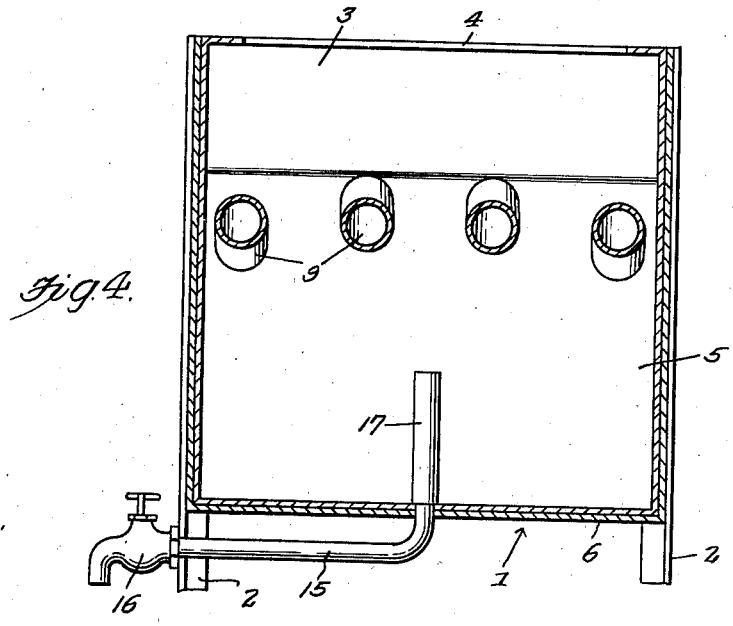
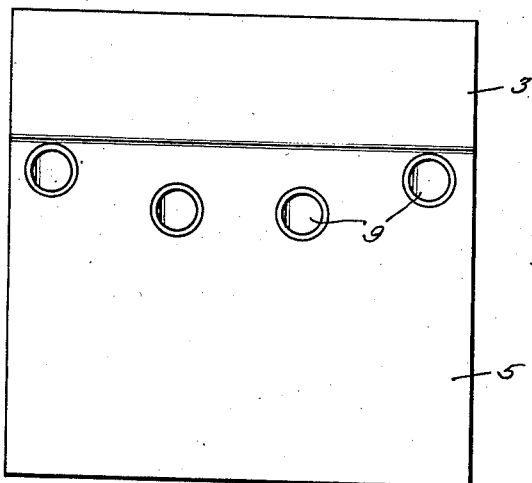
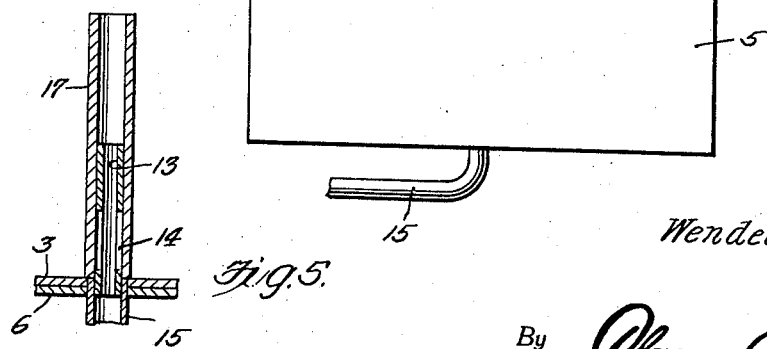
Inventor
Wendell W. Stead
By Clarence A. O'Brien
Attorney Inventor
Wendell W. Stead, By *Clarence A O'Brien*

Attorney

Patented Dec. 15, 1942

2,305,039

UNITED STATES PATENT OFFICE 2,305,039

DEEP FAT FRYER

Wendell W. Stead, Flint, Mich.

Application May 20, 1941, Serial No. 394,359

1 Claim. (Cl. 53—7)

The present invention relates to new and useful improvements in deep fat fryers for doughnuts, potato chips and other foods and has for its primary object to provide, in a manner as hereinafter set forth, a device of this character comprising novel heating means whereby only the upper portion of the fat will be heated to frying temperature and the lower portion thereof left comparatively cool.

Another very important object of the invention is to provide a deep fat fryer of the aforementioned character comprising unique means whereby the liquids may be drained from the upper portion of the kettle and the sediment in the lower portion of said kettle then drained therefrom.

Other objects of the invention are to provide a deep fat fryer of the character described which will be comparatively simple in construction, strong, durable, highly efficient and reliable in use, compact, light in weight, attractive in appearance and which may be manufactured and operated at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of the kettle forming an important feature on the invention.

Figure 4 is a cross sectional view, taken substantially on the line 4—4 of Figure 2.

Figure 5 is a detail view in vertical section through the drain device.

Figure 3:
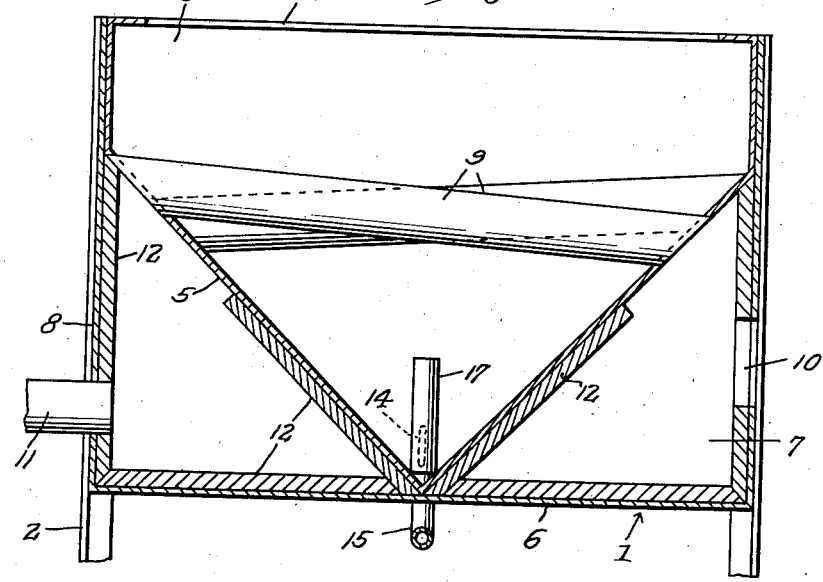
Figure 3 is a vertical section view, taken substantially on the line 3—3 of Figure 2.
Figure 2:
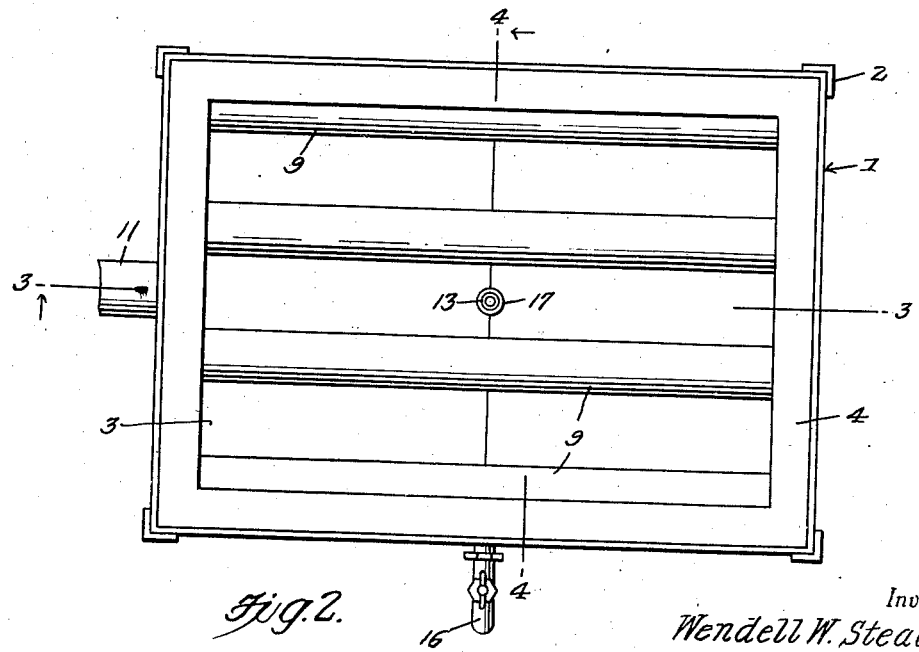
Figure 2 is a top plan view thereof.

Referring now to the drawings in detail, it will be seen that the embodiment of the invention which has been illustrated comprises a substantially rectangular casing 1 of suitable material, said casing being of any desired dimensions and open at its top. The casing 1 is provided with supporting legs 2.

Mounted in the casing 1 is a kettle 3 of suitable metal which is open at its top and provided with an internal flange 4. The kettle 3 further includes a substantially V-shaped lower portion 5 which extends to the bottom 6 of the casing 1. Thus, chambers 7 and 8 are provided in the casing 1.

Extending between the upper portions of the walls of the substantially V-shaped portion 5 of the kettle 3 and communicating with the chambers 7 and 8 is a plurality of oppositely inclined flues 9. The chamber 7 is for the reception of a suitable burner or heater. An opening 10 is provided in one of the walls of the chamber 7 for the introduction of this burner or heater. Communicating with the lower portion of the chamber 8 is an exhaust flue 11. Portions of the walls of the chambers 7 and 8 are provided with insulation 12.

Mounted in the lowermost portion of the kettle 3 and extending through the bottom thereof and the bottom 6 of the casing 1 is a tube 13. The tube 13 is vertical and has formed therein slots 14. Connected to the tube 13 is a drain pipe 15 which is provided with a control valve 16. Slidably mounted on the tube 13 and rising therefrom is a sleeve 17. The tube 13 and the sleeve 17 are open at both ends.

It is thought that the operation of the device will be readily apparent from a consideration of the foregoing. Briefly, the kettle 3 is filled with fat to the desired level above the flues or tubes 9. Heat from the burner or heater in the chamber 7 passes through the flues 9 into the chamber 8 from which it escapes through the flue 11. The construction and arrangement is such that a substantially uniform distribution of the heat is had. Further, the fat from the flues 9 upwardly is rapidly brought to frying temperature while a comparatively cool zone is left in the lower portion of the hopper into which flour, crums, etc., may gravitate. The temperature of the fat in this comparatively cool zone is not high enough to cause the sediment which settles therein to carbonize and smoke. By opening the valve 16 the liquid above the level of the sleeve 17 may be conveniently drained from the kettle 3. By removing the sleeve 17 the sediment may be drained from the kettle through the tube 13. Or, the sleeve 17 may be simply elevated on the tube 13 sufficiently to expose the vertical slots 14.

It is believed that the many advantages of a deep fat fryer constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A deep fat fryer comprising a casing including vertical walls, a kettle, for the reception of fat, mounted in said casing, said kettle including a substantially V-shaped lower portion defining, in conjunction with the casing, a pair of chambers, the bottom of the casing and the portions of the vertical walls thereof which are below the V-shaped portion of the kettle being heat insulated, the lower portions only of the oppositely inclined walls of the V-shaped portion of the kettle being heat insulated, and a plurality of flues extending between the uninsulated portions of the oppositely inclined walls of the substantially V-shaped portion of the kettle and communicating with the chambers.

WENDELL W. STEAD.